United States Patent
Tom et al.

(10) Patent No.: US 8,161,157 B2
(45) Date of Patent: *Apr. 17, 2012

(54) METHOD FOR DISPLAYING WEB USER'S AUTHENTICATION STATUS IN A DISTRIBUTED SINGLE LOGIN NETWORK

(75) Inventors: Allen Lee Tom, Mountain View, CA (US); Mohan Kumar S. Bethur, San Jose, CA (US); Hyun Jong Shin, Redwood City, CA (US); Jun-Shong Huang, San Jose, CA (US)

(73) Assignee: AOL Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/851,502

(22) Filed: Aug. 5, 2010

(65) Prior Publication Data

US 2010/0306660 A1 Dec. 2, 2010

Related U.S. Application Data

(63) Continuation of application No. 11/946,803, filed on Nov. 28, 2007, now Pat. No. 7,788,376, which is a continuation of application No. 10/365,979, filed on Feb. 12, 2003, now Pat. No. 7,305,470.

(51) Int. Cl.
*G06F 15/16* (2006.01)
*G06F 7/04* (2006.01)
*G06F 3/00* (2006.01)

(52) U.S. Cl. ........ 709/225; 709/218; 709/219; 709/229; 726/4; 726/8; 715/741; 715/744

(58) Field of Classification Search .................. 709/203, 709/217, 219, 225, 227–229; 726/3–8; 715/513, 715/741–747, 760, 772, 779, 808–811
See application file for complete search history.

(56) References Cited

U.S. PATENT DOCUMENTS

| | | | |
|---|---|---|---|
| 5,778,377 A | 7/1998 | Marlin et al. | |
| 5,963,925 A | 10/1999 | Kolling et al. | |
| 5,970,477 A | 10/1999 | Roden | |
| 5,974,572 A | 10/1999 | Weinberg et al. | |
| 5,978,648 A | 11/1999 | George et al. | |
| 5,987,611 A | 11/1999 | Freund | |
| 5,999,179 A | 12/1999 | Kekic et al. | |
| 6,073,119 A | 6/2000 | Bornemisza-Wahr et al. | |

(Continued)

FOREIGN PATENT DOCUMENTS

EP 774 725 5/1997

(Continued)

OTHER PUBLICATIONS

*Netegrity Siteminder*; Ask the Experts—SearchCIO.com—Ebusiness Security Expert(s): Puneet Mehta; Dec. 4, 2001.
*5.8: Single Sign-On*; Single Sign-On: WebSphere Application Server—InfoCenter Home>5: Securing applications—special topics > 5.8: Single Sign-On; Feb. 10, 2003.

(Continued)

*Primary Examiner* — Philip Chea
(74) *Attorney, Agent, or Firm* — Michael A. Glenn; Glenn Patent Group

(57) ABSTRACT

The invention provides a system and method for automatically displaying a user's logged-in status across an Internet based network of affiliated Web sites via a visual indicator such as a toolbar to help the user to be certain about his logged-in status when he stays with one or switches from one to another affiliated Web site.

10 Claims, 6 Drawing Sheets

U.S. PATENT DOCUMENTS

| | | | |
|---|---|---|---|
| 6,112,190 | A | 8/2000 | Fletcher et al. |
| 6,115,040 | A | 9/2000 | Bladow et al. |
| 6,192,405 | B1 | 2/2001 | Bunnell |
| 6,272,537 | B1 | 8/2001 | Kekic et al. |
| 6,341,316 | B1 | 1/2002 | Kloba et al. |
| 6,385,494 | B1 | 5/2002 | Blahnik et al. |
| 6,385,595 | B1 | 5/2002 | Kolling et al. |
| 6,385,655 | B1 | 5/2002 | Smith et al. |
| 6,397,378 | B1 | 5/2002 | Grey et al. |
| 6,401,220 | B1 | 6/2002 | Grey et al. |
| 6,421,717 | B1 | 7/2002 | Kloba et al. |
| 6,434,607 | B1 | 8/2002 | Haverstock et al. |
| 6,442,590 | B1 | 8/2002 | Inala et al. |
| 6,460,058 | B2 | 10/2002 | Koppolu et al. |
| 6,668,322 | B1 | 12/2003 | Wood et al. |
| 6,701,438 | B1 | 3/2004 | Prabandham et al. |
| 6,763,468 | B2 | 7/2004 | Gupta et al. |
| 6,826,696 | B1 | 11/2004 | Chawla et al. |
| 6,859,878 | B1 | 2/2005 | Kerr et al. |
| 6,892,307 | B1 | 5/2005 | Wood et al. |
| 6,941,376 | B2 | 9/2005 | Mitchell et al. |
| 6,970,904 | B1 | 11/2005 | Rode |
| 6,985,953 | B1 | 1/2006 | Sandhu et al. |
| 7,010,582 | B1 | 3/2006 | Cheng et al. |
| 7,016,875 | B1 | 3/2006 | Steele et al. |
| 7,032,241 | B1 | 4/2006 | Venkatachary et al. |
| 7,069,293 | B2 | 6/2006 | Cox et al. |
| 7,093,020 | B1 | 8/2006 | McCarty et al. |
| 7,150,038 | B1 | 12/2006 | Samar |
| 7,188,360 | B2 | 3/2007 | Gerdes et al. |
| 7,191,467 | B1 | 3/2007 | Dujari et al. |
| 7,225,464 | B2 | 5/2007 | Satyavolu et al. |
| 7,885,996 | B2 * | 2/2011 | Mukundan et al. ........... 709/203 |
| 2003/0014519 | A1 | 1/2003 | Bowers et al. |
| 2003/0140120 | A1 | 7/2003 | Hartman |
| 2004/0158746 | A1 | 8/2004 | Hu et al. |
| 2005/0022006 | A1 | 1/2005 | Bass et al. |
| 2005/0144452 | A1 | 6/2005 | Lynch et al. |
| 2006/0107217 | A1 | 5/2006 | Lu et al. |

FOREIGN PATENT DOCUMENTS

| | | |
|---|---|---|
| EP | 907 120 | 4/1999 |
| EP | 1 168 203 | 1/2002 |
| EP | 1 168 204 | 1/2002 |
| EP | 1 168 765 | 1/2002 |
| EP | 1 227 635 | 7/2002 |

OTHER PUBLICATIONS

*Universal Wed Agent Datasheet*; Home>Products>Authentication and Access Control>SafeWord™ PremierAccess™ >Applications Protected by PremierAccess>Universal Web Agent; Feb. 2002.

*Not Another ID and Password: A Look at Single Sign-On*; M. Bonham II; Feb. 10, 2003.

*Challenge 2: Cross Domain Authentication (Web SSO)*; OneName Corporation; Home>Products & Solutions>7 digital Identity Challenges>Challenge 2; Feb. 10, 2003.

*Securant Debuts Single Sign-On Across Multiple Sites*; G. Hulme; InformationWeek Online; May 2000.

*Extended SSO*; Integrating Siebel 2000 (6.X) and Siebel 7 Into Your SSO Environment—p. 4; Netegrity Portal Security Software; Feb. 10, 2003.

*Numerical Relativity in a Distributed Environment*; W. Benger, I. Foster, J. Novotny, E. Seidel, J. Shalf, W. Smith, P. Walker; Apr. 1999.

*Issues in the Security Architecture of the Computerized Patient Record Enterprise*; K. Beznosov; Apr. 1998.

*Entrust TruePass™*; Entrust: Entrust TruePass—Frequently Asked Questions; Feb. 10, 2003.

*Securing Access to BEA WebLogic® Applications Using SafeWord™ PremierAccess™*; Home>Products>Authentication and Access Control>SafeWord™ PremierAccess™>Applications Protected by PremierAccess>Application interoperability papers>BEA WebLogic®; Feb. 10, 2003.

*Multi-Layer Security Support for Wireless Communications Across Multiple Trusted Domains*; J. Kong, M. Gerla, B.S. Prabhu, R. Gadh; UCLA Computer Science Department Technical Report 020032; Sep. 2002.

*Authentication in Distributed Systems: Theory and Practice*; B. Lampson, M. Abadi, M. Burrows, E. Wobber; Digital Equipment Corporation; Nov. 1992.

*Preserving State on the World Wide Web Using Dynamic Argument Embedding*; A. Iyengar; IBM Research Division; T.J. Watson Research Center; Mar.-Apr. 1997.

*Using Netscape Directory Server to Manage NT Domains*; G. Yost; NT Insights; 1999.

*Role-Based Security for Distributed Object Systems*; N. Yialelis, E. Lupu, M. Sloman; Department of Computing, Imperial College; Jun. 19-21, 1996.

* cited by examiner

METHOD FOR DISPLAYING WEB USER'S AUTHENTICATION STATUS IN A DISTRIBUTED SINGLE LOGIN NETWORK

CROSS REFERENCE TO RELATED APPLICATION

This application is a continuation of U.S. patent application Ser. No. 11/946,803, filed Nov. 28, 2007, which is a continuation of U.S. patent application Ser. No. 10/365,979, filed Feb. 12, 2003, which applications are fully incorporated herein in their entireties by this reference thereto.

BACKGROUND OF THE INVENTION

1. Technical Field

This invention relates generally to cross domain authentication technology. More particularly, the invention relates to a method and system for automatically displaying a Web user's authentication status across an Internet based network of participating Web sites.

2. Description of the Prior Art

To request a service or conduct other electronic transactions in an Internet based network, a user is usually required to go through an authentication process. In other words, the user is required to provide the seller or service provider with some credential information, such as his personal identification, contact information, or even financial information. The authentication process may take from several seconds to several minutes. Because each seller or service provider usually maintains its own authentication server and database, millions of sellers and service providers might share thousands or millions of consumers or users. Some of the consumers or users might be required to go through the same or substantially similar authentication process again and again if they have transactions with many sellers or service providers. This repetitive authentication not only wastes the consumers' time, but also burdens the sellers or service providers because they have to expand their databases to keep detailed authentication information for a growing number of users. This situation brings forth a technical need to create a universal, unified, single-login infrastructure wherein a specific user may be authenticated once for all and the authentication result is widely recognized by a large number of sellers or service providers.

In responding to that need, several approaches have been developed. For example, Microsoft Corporation has introduced a ".NET Passport" single sign-in system. With ".NET Passport," a user does not need to register a member name and password at each affiliated site he visits. The user may simply use his e-mail address and password that registered as his ".NET Passport" to sign in to any participating site of the network. The information the user registers with ".NET Passport" is stored online, securely, in the ".NET Passport" database as the user's ".NET Passport profile." When the user signs in to a ".NET Passport" participating site by typing his e-mail address and password in the ".NET Passport" sign-in box, ".NET Passport" confirms that (1) the e-mail address he entered is registered with ".NET Passport", and (2) the password he entered is correct. ".NET Passport" then notifies the site that the user has provided valid "sign-in credentials," and thus he is given access to the participating site. Once the user signs in to one ".NET Passport" participating site during an Internet session, he can sign in to any other site simply by clicking the ".NET Passport" sign-in button available at the site.

Another example is America Online Incorporated (AOL)'s "Screen Name Service" system, which provides a free service allowing anyone with a "Screen Name" to register easily and securely at a variety of Web sites. The "Screen Name Service" eliminates a user's need to remember multiple names and passwords for all the places he visits on the Web. With the "Screen Name Service" system, each user has a "My Profile", which stores the user's personal credentials used to make registration at sites across the Web simple and secure. When the user registers at a participating site using the service, he has the opportunity to choose which fields of information stored by AOL, if any, he would like to share with that site. No information is shared with any site without the user's explicit permission. When the user agrees to share certain information with a participating site, that information is conveyed to the site at which he is registering. Another feature is that the user is provided with a "My Site List", which is an effective way to manage personal information because it shows the user with which sites he has registered using the service. The user can view the privacy policy of a site to see how it uses information it knows about the user. The user can also decide if he would like to be signed into the site without being prompted and if the site should be updated with information when "My Profile" changes.

In these distributed single login networks, cross domain status toolbars or indicators are static and do not display a personalized greeting across multiple domains. For example, when the user with a screen name "ljewpt9" logs in the MSN e-mail service, his full e-mail address ljewpt9@hotmail.com is displayed in the upper-left corner of every mail service pages such as the "inbox," "sent," "trash," etc. When the user switches to other pages hosted by MSN, such as "search," "music," "sports," neither the user's e-mail address, nor his screen name, nor his first name or last name associated with his account is displayed. There is only a small bar "sign Out.net" embedding in the pages. Without a close look, the user is not certain whether he is still logged-in or who is currently logged-in on the page. Similarly, when the user switches from an MSN page to any other affiliated website with ".NET Passport", the user's logged-in status or personalized greeting is not expressly displayed in the targeted pages.

Websites, such as yahoo.com and amazon.com, display personalized greetings on their sites, but only on pages under the same domain from which they originally authenticated. For example, a user, with a screen name "ljewpt9", who is authenticated to yahoo.com can only be identified on Web pages hosted on yahoo.com. When the user logs in the yahoo e-mail service, his full e-mail address ljewpt9@yahoo.com is displayed in the upper-right corner of every mail service pages such as the pages for "inbox", "draft", "sent", "trash", and "bulk", etc. When the user switches to "Yahoo! Travel" or "Weather", a greeting like "Welcome, Ljewpt9" is displayed on the page. However, the user's login status cannot be displayed on any other Web pages which are not hosted by yahoo.com.

What is desired is a mechanism to automatically display a user's logged-in status across an Internet based network of affiliated Web sites so that the user is certain about his logged-in status when he stays with one or switches from one to another affiliated Web site.

SUMMARY OF THE INVENTION

The invention provides a system and method for automatically displaying a user's logged-in status across an Internet based network of affiliated Web sites via a visual indicator such as a toolbar to help the user to be certain about his logged-in status when he stays with one or switches from one to another affiliated Web site. The visual indicator has two modes: logged-in and logged-out. In the logged-in mode, the indicator displays the user's login name, such as a screen name or a personalized greeting, and a virtual button, by clicking which the user signs out. In the logged-out mode, the indicator displays a virtual button for signing in. When the user has signed in one participating site of the network, the user is automatically recognized at all other sites which use the visual indicator.

The visual indicator is hosted on a single Web site. Once the user has been authenticated to the indicator Web site, the user is recognized at all affiliated Web sites that embed the indicator. A Web site embeds the indicator by instructing the user's Web browser to load additional JavaScript from the indicator Web site. The additional JavaScript writes the indicator HTML onto the Web page that the user visits.

The invention allows a participating Web site to recognize a user who has never visited the site before and customize its content based on the user. The invention can also be used to track users across multiple Web sites to determine their interests and to display customized content and promotions targeted to the user.

BRIEF DESCRIPTION OF THE DRAWINGS

FIG. 5a is an exemplary page where the status indicator is in logged-in mode showing the user is validly logged in;

DETAILED DESCRIPTION OF THE INVENTION

Figure 1:
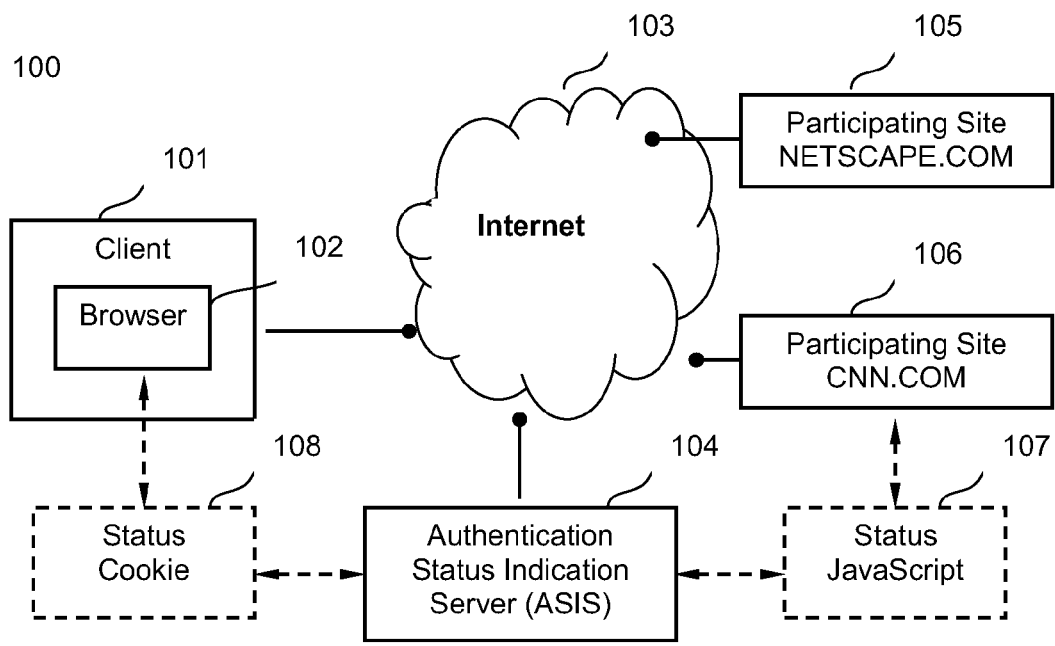
FIG. 1 is a schematic block diagram illustrating a distributed, single login network according to the invention.

FIG. 1 is schematic block diagram illustrating a distributed, single login network 100 which comprises at least one client 101 with a Web browser 102, an authentication status indication server (ASIS) 104, a plurality of participating websites such as NETSCAPE.COM 105 and CNN.COM 106, communicatively coupled to the Internet 103. The ASIS 104 centrally hosts the authentication status indicator in all affiliated sites. The authentication status indicator, which displays the user's authentication status information, may be incorporated in a dashboard or a toolbar or any other visual cue on the Web pages. The status information may include the user's login name, such as his screen name or his e-mail address or even his full name, and/or a short welcome message or other information. The content of the visual indicator, i.e. the user's status information is centrally served, managed, and tracked.

The participating sites embedding the status indicator do not need to run any additional software or Web server plug-ins to display the indicator. However, they must include a few lines of HTML and a small piece of JavaScript code, called bootstrapping code, in their page headers. The function of the bootstrapping code is to instruct the user's Web browser 102 to load additional JavaScript 107 from the ASIS 104 to render each participating website's status indicator in logged-in mode or logged-out mode.

All content updates are managed from one single site, i.e. the ASIS 104. The participating sites which deploy the bootstrapping code automatically get future revisions on the dashboard without any additional work.

An exemplary of the bootstrapping code is given below:

```
<table border="O" cellpadding="O" cellspacing="O" width="WWW">
    <tr><td>
        <script Language="Javascript" SRC= "http://tool
bar.aol.com/dashboard.twhat?dom=XXX">
        </script>
    </td><tr>
</table>
```

Here, WWW should be the desired width in pixels of the Dashboard and XXX should be the site's three digit partner code.

The user's authentication status information is stored in an authentication status cookie 108 which is sent to the ASIS 104 when the user is logged into the network 100. The ASIS 104 checks the validity of the received cookie and returns JavaScript 107 to render the toolbar in logged-in mode if the cookie is valid, or logged-out mode if the cookie is missing or invalid.

Because the authentication status cookie 108 is stored on one central server (ASIS 104), the cookie 108 can be shared across multiple participating sites if each site embeds the bootstrapping code on their Web pages. The cookie is bound to the ASIS 104, not to the top level domains such as .NETSCAPE.COM or .AOL.COM. Since the cookie 108 should only be read by the ASIS 104, it should be acceptable to keep the cookie in clear text. This eliminates the computational overhead of decrypting the cookie for each page view. Alternatively, the ASIS 104 may use other authentication methods without using a local status cookie.

To prevent unauthorized sites from reading the user's sensitive personal data, the ASIS 104 never returns the user's screen name in the indicator JavaScript or in text form. Instead, an image containing the screen name is used and the browser 102 is instructed to display the image. This mechanism prevents unauthorized sites from reading or extracting the screen name or other personal information from users who visit them.

Alternatively, each website could maintain their own authentication scheme, using cookies or some other method. A website would have no way of determining if the user has logged into any other participating website. A system could be devised where a participating website would redirect the user's browser to a third party site which would then somehow pass the authentication credentials back to the originating site, if the user is logged in. However, the originating site would have to redirect all users to this third party site, without knowing ahead of time if the user is logged in. Redirecting the user to another site to check the authentication status is very complicated (special software and protocols must be installed and agreed upon between the originating site and the third party site) and also adds a great deal of time needed to display the content on the originating site.

Note that the authentication status indication server (ASIS) 104 is built on top of a single login service (cross sites authentication) such as AOL's Screen Name Service (SNS). Without ASIS 104, the participating sites of the single login service such as SNS would not be able to automatically recognize users who are signed into a different domain via SNS. To recognize a user who is already signed into a first site via SNS, a second site would require the user to click on a login button. There was no way to recognize the user automatically without the user's intervention. However, this invention allows users to be recognized and authenticated across multiple domains. Once a user has been authenticated to one participating site that embeds the status indicator, the toolbar for example, the user is recognized at all other participating sites that embed the indicator.

Figure 2:
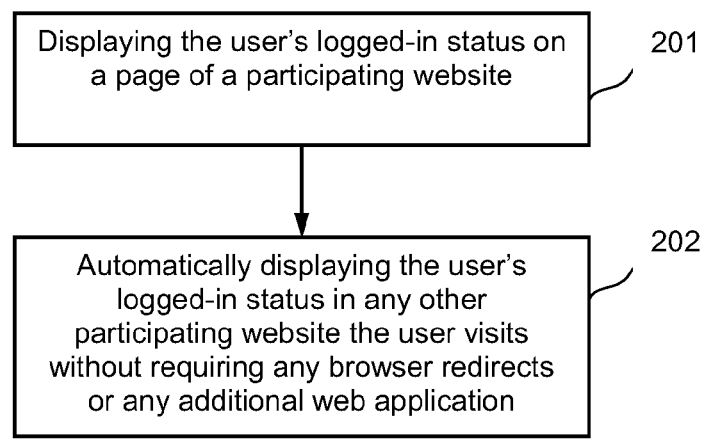
FIG. 2 is a schematic flow diagram illustrating a method for automatically displaying a Web user's authentication status in a distributed single login network according to the invention.

FIG. 2 is a schematic flow diagram illustrating a method for automatically displaying a Web user's authentication status in a distributed single login network according to the invention. The method comprises the steps of:

Step 201: Displaying the user's logged-in status on the page of a participating website from which the user logged in the network 100; and Step 202: When the user switches from one participating website to another participating website with a different domain, automatically displaying the user's logged-in status in said another participating website without requiring any browser redirects or any additional Web application. No client software such as browser plug-in or special client application is required to be installed on the user's computer, nor is any special Web application or server software required to be installed on the participating site's servers.

Figure 3A:
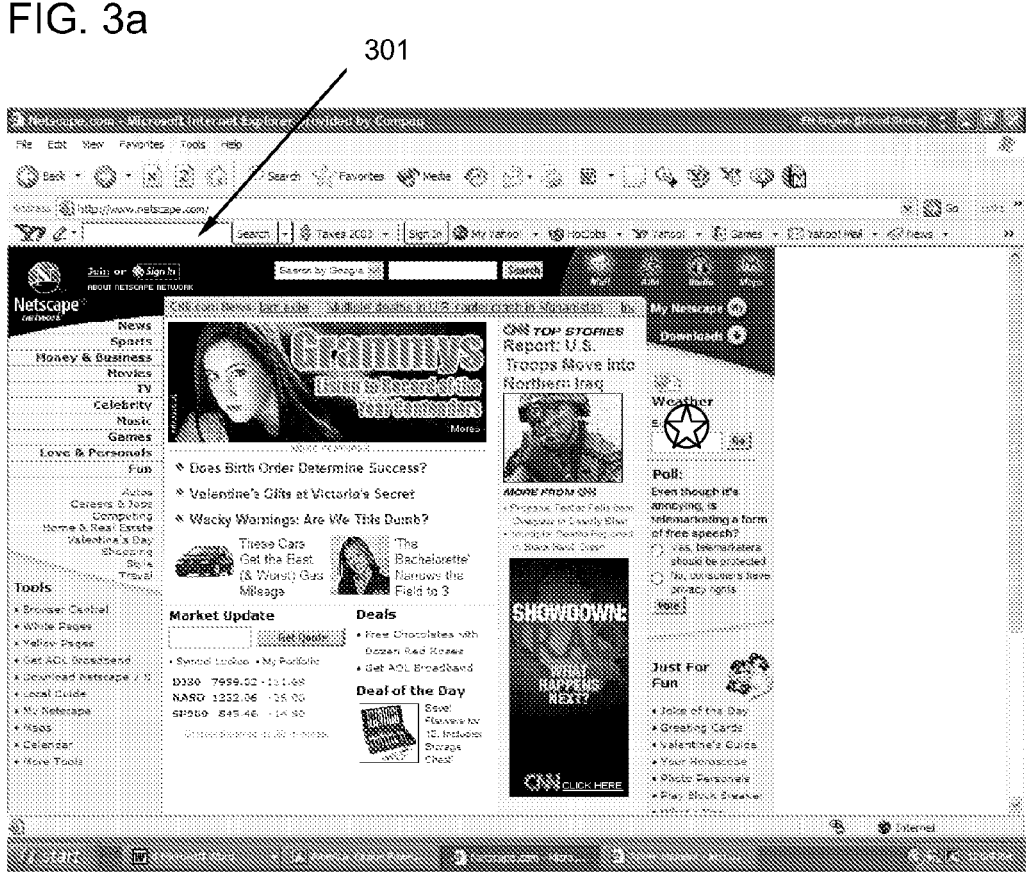
FIG. 3a is an exemplary page where an authentication status indicator is in its logged-out mode.

FIG. 3a is an exemplary page of NETSCAPE.COM where an authentication status toolbar 301 is in its logged-out mode. The toolbar may be in any color or any shape, and may be placed anywhere in the page.

Figure 3B:
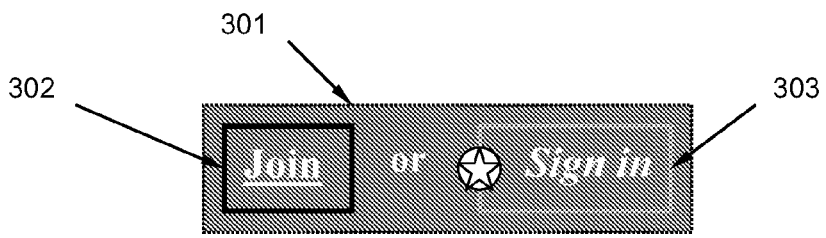
FIG. 3b is a schematic diagram showing a typical graphical arrangement of the status indicator in logged-out mode.

FIG. 3b illustrates a typical graphical arrangement of the toolbar 301 in logged-out mode. By clicking the "Join" button 302, a user is prompted to a registration page for joining as a member. Similarly, by clicking the "Sign in" button 303, the user will be prompted to a "sign in" page for authentication.

Figure 4:
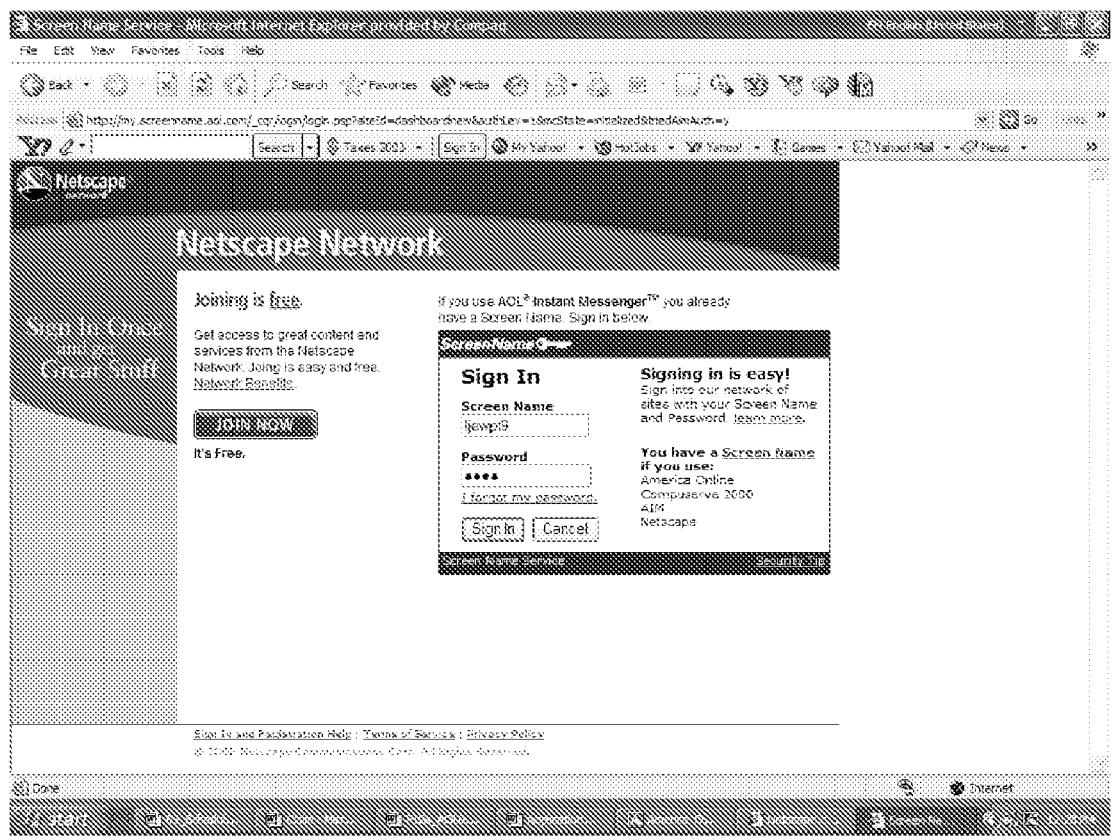
FIG. 4 is an exemplary "sign in" page where the user enters his login name and his password for authentication.

FIG. 4 is an exemplary "sign in" page 401 of NETSCAPE.COM where the user enters his screen name "Ljewpt9" and his password "****" for authentication.

Figure 5A:
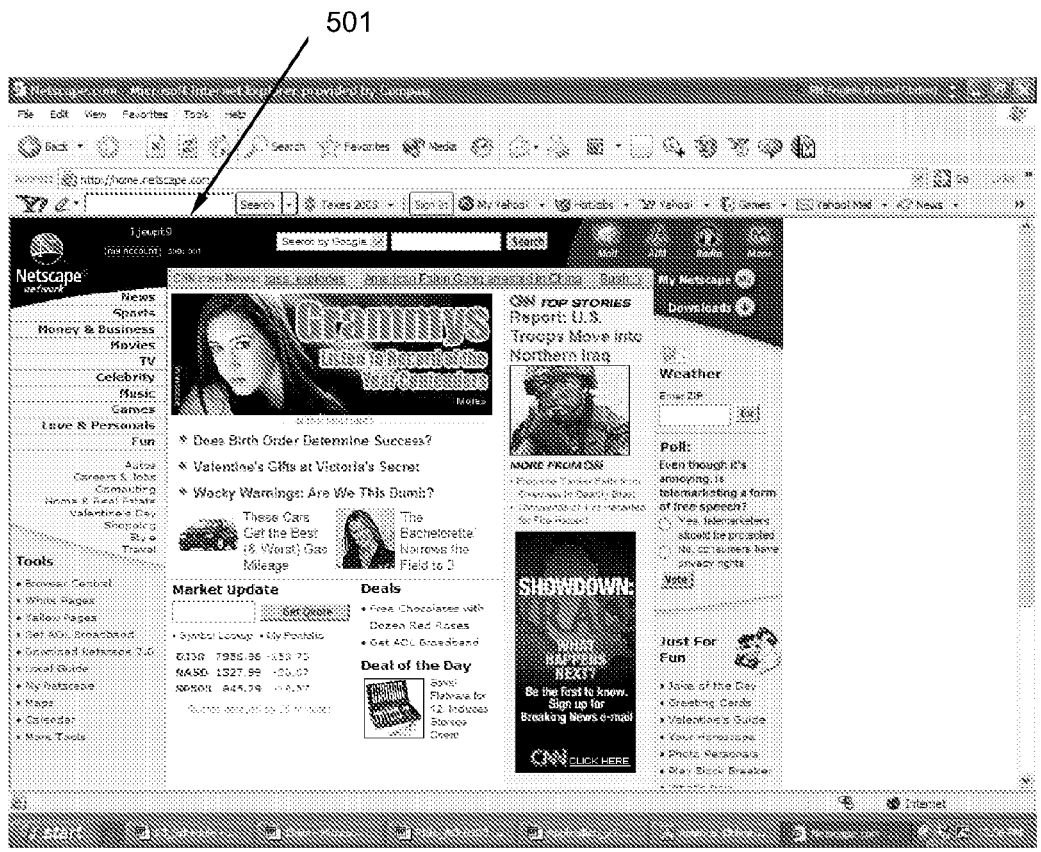

FIG. 5a is an exemplary page of NETSCAPE.COM where the authentication status toolbar is in logged-in mode 501. The toolbar may be in any color or any shape, and may be placed anywhere in the page.

Figure 5B:
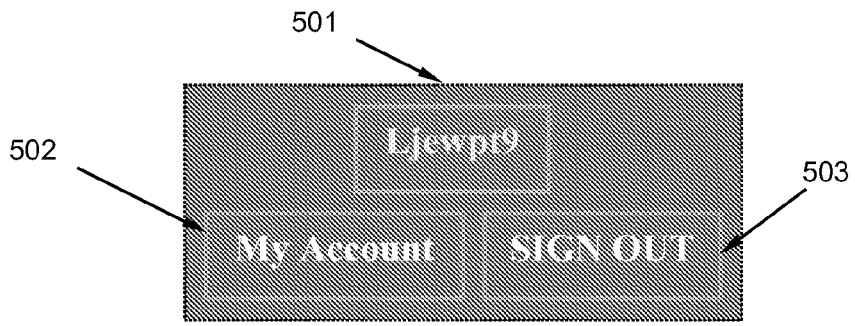
FIG. 5b is a schematic diagram showing a typical graphical arrangement of the status indicator in its logged-in mode.

FIG. 5b illustrates a typical graphical arrangement of the status toolbar in its logged-in mode 501 which comprises the user's screen name, a "My Account" button 502, which links to an account information page, and a "Sign out" button 502, by clicking which the user signs out.

Figure 6A:
FIG. 6a is an exemplary page of a participating site where the user's logged-in status is automatically displayed in the status indicator when the user switches to this site.

FIG. 6a is a sample page of CNN.COM, a participating site where the user now visits. The user's logged-in status is automatically displayed in the status toolbar which is also in logged-in mode 601.

Figure 6B:
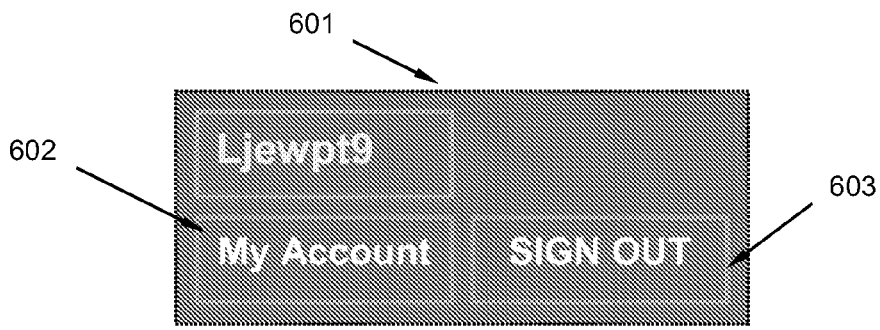
FIG. 6b is an exemplary schematic diagram of the status indicator in logged-in mode with a slightly different appearance.

FIG. 6b illustrates the status toolbar in its logged-in mode 601 which is slightly different in size and font from the status toolbar as illustrated in FIG. 5b. The status toolbar in logged-in mode comprises the user's screen name, a "My Account" button 602, which links to an account information page, and a "sign out" button 602, by clicking which the user signs out.

Note that once the user logs in any participating site, the logged-in status is recognized at any other participating site simultaneously without need to redirect the user's logged-in status from a central server back to the user's Web browser.

Figure 7:
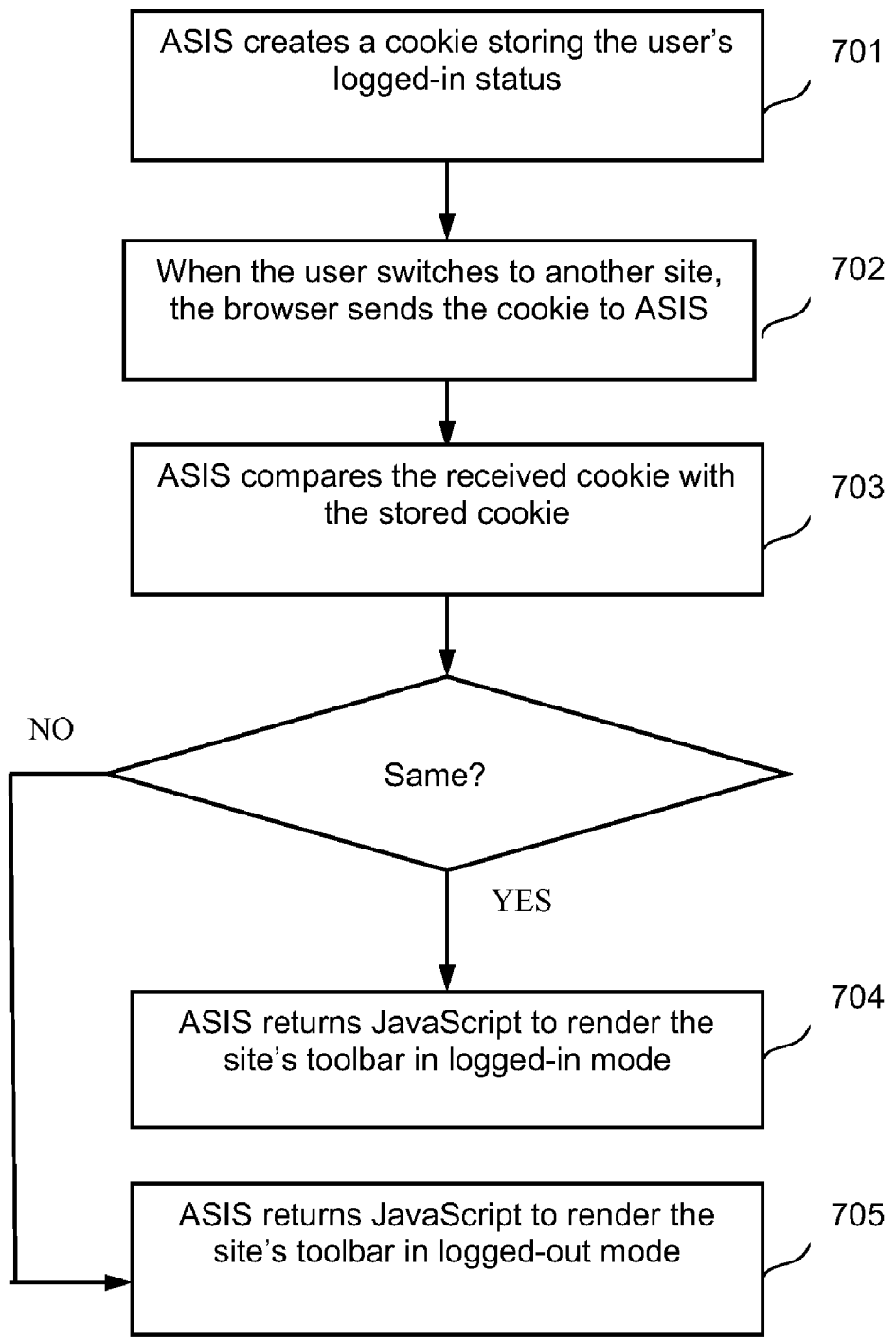
FIG. 7 is a flow diagram illustrating a method for automatically displaying a Web user's authentication status in a distributed single login network using an authentication status cookie according to the invention.

FIG. 7 is a flow diagram illustrating a method for automatically displaying a Web user's authentication status in a distributed single login network using a status cookie according to the invention. The method comprises the steps of:

Step 701: Whenever the user logs in the network 100, the authentication status indication server (ASIS) 104 returns JavaScript to have the user's Web browser load the status toolbar in logged-in mode and at the same time creates a cookie 108 storing the user's logged-in status and sends the status cookie to the user's Web browser 102;

Step 702: Whenever the user switches from one participating website to any other participating website in a different domain, the user's Web browser 102 sends the cookie 108 to the ASIS 104;

Step 703: The ASIS 104 compares the received cookie with the stored cookie 108;

Step 704: If the received cookie is identical with the stored cookie 108, the ASIS 104 returns JavaScript 107 to render said any other participating website's toolbar in logged-in mode (see FIG. 6a and FIG. 6b, 601); and Step 705: If no cookie is received or the received cookie is not identical with the stored cookie 108, the ASIS 104 returns JavaScript 107 to render said any other participating website's toolbar in logged-out mode.

The method described above allows a participating Web site to recognize a user who has never visited the site before and customize its content based on the user. It also allows the users to personalize their UIs and look and feel of multiple Web sites. In addition, the method can also be used to track users across multiple Web sites to determine their interests and to display customized content and promotions targeted to the user.

Although the invention is described herein with reference to the preferred embodiment, one skilled in the art will readily appreciate that other applications may be substituted for those set forth herein without departing from the spirit and scope of the present invention.

Accordingly, the invention should only be limited by the Claims included below.

The invention claimed is:

1. A method for automatically displaying a Web user's authentication status in a distributed single-login network, comprising the steps of:
    embedding code that instructs the user's web browser to load a visual indicator from an authentication server in said distributed single-login network showing a logged-in or a logged-out status as the user moves from one web site to any other participating web site; and
    displaying said user's logged-in status on said visual indicator in a participating website.

2. The method of claim 1, further comprising the steps of:
    displaying said user's logged-in status on a first visual indicator in a participating website from which said user has logged in said network; and
    when said user switches from any participating website to any other participating website in a different domain, automatically displaying said user's logged-in status on another visual indicator in said any other participating website without requiring any browser redirects or any additional pre-installed application.

3. The method of claim 1, wherein said visual indicator is displayed in a toolbar of web sites visited by the user.

4. The method of claim 1, wherein said embedded code comprises a small piece of JavaScript bootstrapping code which instructs said user's Web browser to load additional JavaScript from a central server of said network to render each participating website's toolbar in logged-in state or logged-out state.

5. The method of claim 4, wherein whenever said user logs in said network, said central server creates a status cookie storing said user's logged-in status and sends status cookie to said user's Web browser.

6. An apparatus for automatically displaying a Web user's authentication status in a distributed single-login network comprising:
- a processor programmed for embedding code that instructs the user's web browser to load a visual indicator from an authentication server in said distributed single-login network showing a logged-in or a logged-out status as the user moves from one web site to another web site in said distributed single-login network; and
- a processor programmed for displaying said user's logged-in status on said visual indicator in a participating website.

7. The apparatus of claim 6, further comprising:
- a processor programmed for displaying said user's logged-in status on a first visual indicator in a participating website from which said user has logged in said network; and
- a processor programmed for, responsive to said user switching from any participating website to any other participating website in a different domain, automatically displaying said user's logged-in status on another visual indicator in said any other participating website without requiring any browser redirects or any additional pre-installed application.

8. The apparatus of claim 6, further comprising a processor programmed for displaying said indicator in a toolbar of a web site responsive to a visit to said web site by said user.

9. The apparatus of claim 6, wherein said embedded code comprises a small piece of JavaScript bootstrapping code which instructs said user's Web browser to load additional JavaScript from said server to render each participating website's toolbar in logged-in state or logged-out state.

10. The apparatus of claim 9, further comprising a processor programmed for, responsive to said user logging in said network, creating a status cookie storing said user's logged-in status and sending said status cookie to said user's Web browser.

* * * * *